Patented Dec. 30, 1924.

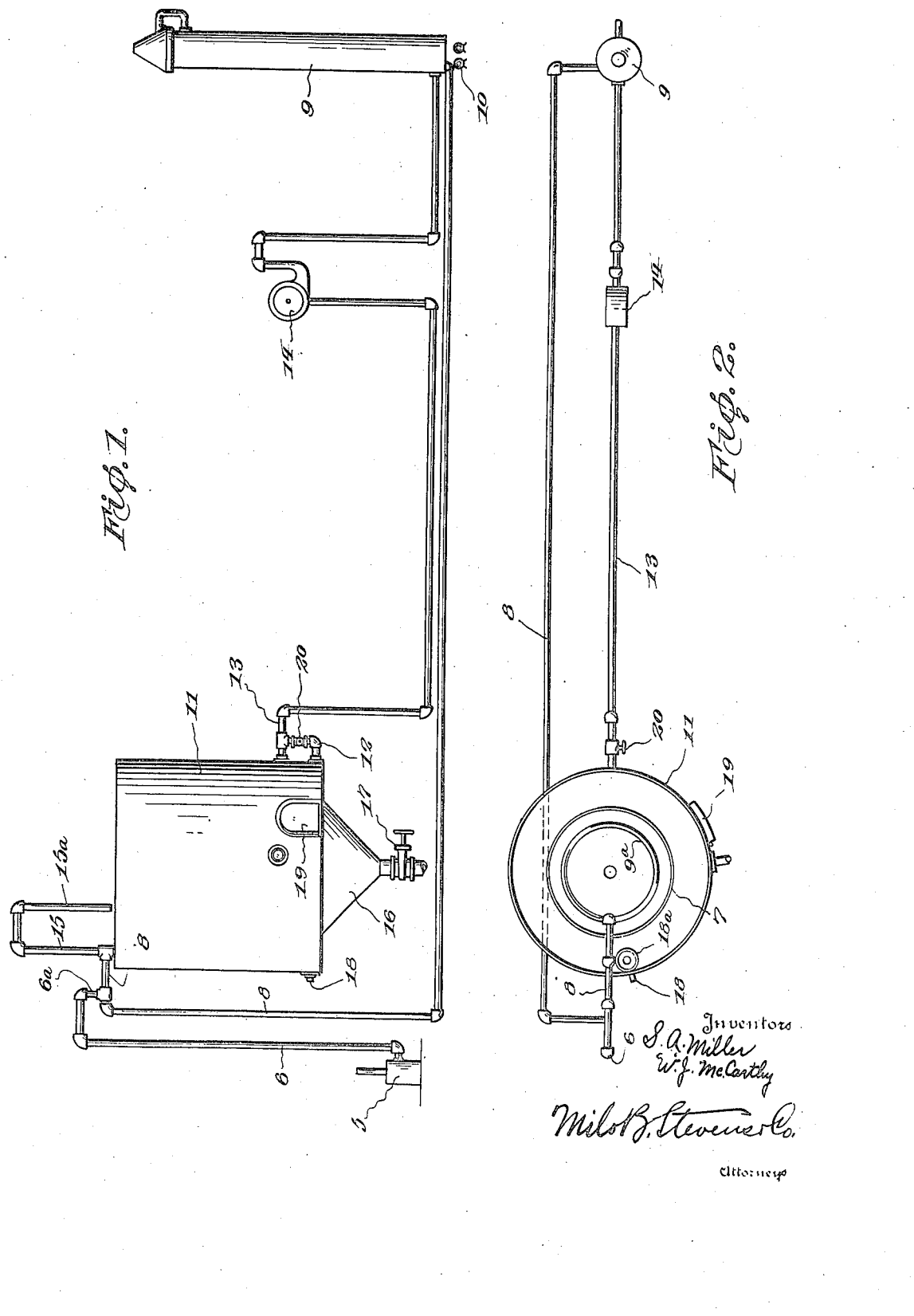

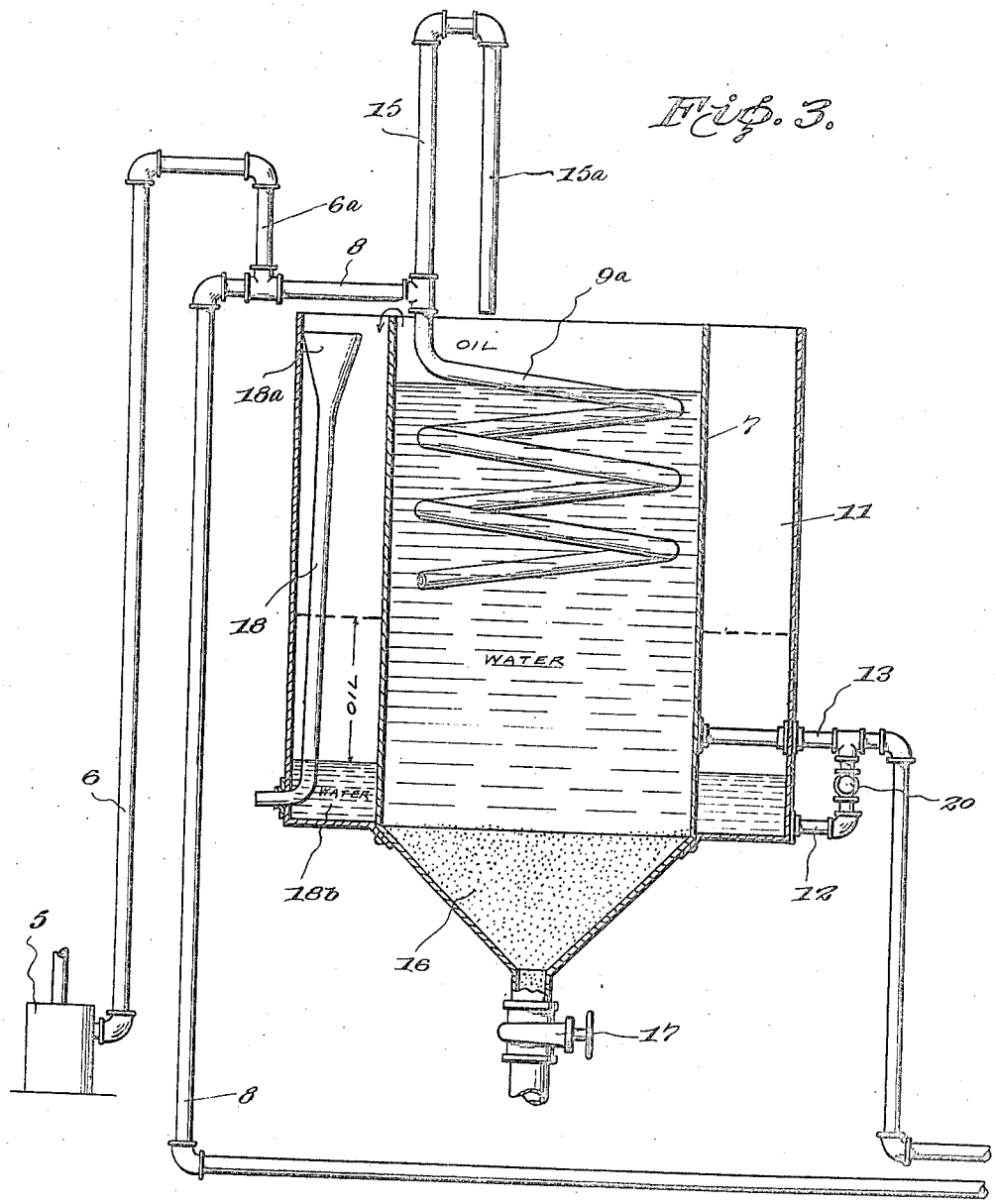

1,521,309

UNITED STATES PATENT OFFICE.

STEPHEN A. MILLER AND WILLIAM J. McCARTHY, OF BAKERSFIELD, CALIFORNIA.

OIL SEPARATOR.

Application filed June 20, 1923. Serial No. 646,631.

*To all whom it may concern:*

Be it known that we, STEPHEN A. MILLER and WILLIAM J. MCCARTHY, citizens of the United States, residing at Bakersfield, in the county of Kern and State of California, have invented new and useful Improvements in Oil Separators, of which the following is a specification.

Our invention relates to the general class of separators, and particularly such that are especially adapted for separating sand and other matter from petroleum.

Crude petroleum as pumped from an oil well invariably contains a considerable quantity of sand and other foreign matter which must be separated therefrom before the petroleum is fitted for commercial purposes and refinement. Heretofore the ordinary practice has been to place the crude petroleum in sumps constructed in the ground, to produce a separation of sand and other foreign matter from the oil. Various other types of settling tanks in conjunction with various processes involving heating, etc., have been employed for this purpose. The difficulty with the first mentioned method of separating the petroleum from sand and other foreign matter is that it is very wasteful, and requires a considerable length of time, there also being eminent danger of fire. The other methods of treating the crude sand-emulsified product have proven very expensive and also require considerable attention. It is therefore the primary object of our invention to provide novel and improved apparatus and process whereby the sand and foreign matter may be quickly separated from the petroleum, a heated liquid being introduced into a conduit leading from the oil well, means being provided whereby said liquid may be reheated and used over and over again, thus obviating the necessity of constant attention to the apparatus.

The invention also has for an object to furnish an apparatus of the character set forth which is very simple in construction, inexpensive of manufacture and operation, and which will be highly efficient in use.

Other objects and advantages of the invention will become apparent in the course of the detailed description appearing hereinafter, and in order that the same may be better understood reference is had to the accompanying drawing forming a part of this specification.

In the drawing:

Figure 1 is an elevation of an apparatus constructed in accordance with our invention;

Fig. 2 is a plan view thereof; and

Fig. 3 is a sectional view of a portion of the apparatus showing settling and separating tank.

Referring specifically to the drawing, wherein the preferred embodiment of the invention is disclosed, and in which like reference characters have been used throughout to designate similar parts, numeral 5 denotes a portion of an oil well pump, from which leads a supply pipe 6 through which the crude petroleum pumped from the well is introduced into a separating chamber 7 through a pipe 8 and a coil $9^a$ within the separating chamber.

The pipe 8 forms a supply conduit from a water heating tank 9, the heater therefor being denoted at 10, a gaseous fuel being supplied thereto as will presently appear. The water from the heating tank 9 is circulated through the pipe 8, the separating tank 7, and communication is also had through a settling tank 11. The settling tank 11 surrounds the separating tank 7 and is provided with a branch 12 connecting with the water outlet 13 of the separating tank. The rotary pump 14 is located in the water outlet 13 in proximity with the heating tank 9 and furnishes the power for rapid circulation of the water.

It will be noted that the oil from the conduit 6 is introduced to the pipe 8 through the branch $6^a$ disposed at right angles to the hot water pipe 8, so that the action of the hot water transversely upon the stream of petroleum will serve to separate the sand and other foreign matter therefrom and will carry it forcibly through the portion of the pipe 8 between the branch $6^a$ and the entry to the coil $9^a$. Such gases as may have been separated from the petroleum may be permitted to rise through a pipe 15 from which they may be conducted to the heater 10 or employed for any other useful purpose. The hot water and oil passing through the coil $9^a$ are discharged from the end thereof, and the sand will be gathered in the bottom of the separating tank which is of conical form as shown at 16. A suitable outlet, with a gate valve 17 is provided for removing the sand from the bottom 16. The oil being lighter than the water will rise to the top of the separating chamber and flow over the wall thereof into the settling chamber 11. It will be understood of course that a considerable quantity of water will collect in the bottom thereof as shown at 18. However since the quantity of water in the settling chamber will be infinitely less than that in the separating chamber, the outlet 12 of the settling chamber will be adjacent the bottom thereof, while the outlet 13 of the separating chamber will be considerably elevated therefrom, since the water level in the separating chamber will be considerably higher. Within the settling chamber, we have provided an overflow pipe 18, the funnel shaped top 18$^a$ thereof being adjacent the outer wall of the chamber and below the rim thereof as clearly shown in Figure 3. Thus any mixture of oil and water going over the outer wall of the separating chamber will not be caught in the top 18$^a$ of the overflow pipe but will drop to the lower portion of the chamber after which the oil will rise and the water will gather in the bottom as previously stated. The oil rising in the settling chamber will flow out of the overflow pipe 18, a suitable pump being used for withdrawal of the oil from the settling tank if desired.

A suitable man hole 19 is provided at the lower portion of the settling tank 7 whereby the same may be cleaned when necessary. In the event that the water in the settling tank has not gathered in a sufficient quantity to warrant the withdrawal thereof into the water circuit, a gate valve 20 is provided between the settling tank outlet 12 and the separating tank outlet 13, which may be closed to prevent the withdrawal of water therefrom. The gas outlet pipe 15 is provided with downward branch 15$^a$ whereby any liquid that has gathered therein may drain into the separating tank 7.

From the foregoing description read in connection with the accompanying drawings, the construction and operation of my separator will be readily appreciated by those skilled in the art. The operation may be briefly summarized as follows:

Before starting the separator it is necessary that a considerable quantity of water be placed in the separating chamber 7, the water, of course having been heated in the tank 9. We have found that best results are obtained by heating the water to about 190° Fahrenheit. Water having been introduced into the separating chamber as above indicated, the oil pump 5 is started and the crude sand-emulsified petroleum introduced to the water pipe 8 through the conduit 6 and branch pipe 6$^a$. The strong rush of heated water pumped by the pump 14 encounters the oil from the pipe 6$^a$ transversely and carries it through that portion of the pipe 8 in advance of the branch 6$^a$ and into the coil 9$^a$, the water, oil and sand being emitted from the end of the coil adjacent one side of the separating chamber which results in a whirling of the mixture, this action tending to assist the settling of the sand which gathers in the bottom 16 of the separating chamber. The oil being lighter than water rises and as the separator chamber fills, will go over the outer walls thereof into the settling chamber. Such water as may be carried over with the oil will accumulate in the bottom of the settling chamber. It will be evident that the continual supply of water to the apparatus will be unnecessary as the same water is used over and over again. The oil from the settling chamber will be pumped therefrom to a suitable pipe line, and since the settling chamber surrounds the separating chamber which is heated by the coils and heated water therein, it will be unnecessary to heat the oil as usual before introducing it into the pipe line to be conducted to a suitable storing tank. It will thus be seen that the separating chamber serves not only the purpose of separating the sand and foreign matter from the oil but also furnishes heat for the settling chamber obviating the necessity of a separate heating means for the oil before it starts on its passage to the storage tank.

While I have described and illustrated the preferred embodiment of my invention, yet it will be understood that various changes and modifications will immediately suggest themselves to those skilled in the art without departing from the spirit of my invention, the scope of which is set forth in the following claims.

Having thus described our invention what we claim as new and desire to secure by Letters Patent is:

1. In an apparatus of the character specified the combination with a separating tank having a sand discharge valve, of a settling tank surrounding the separating tank and adapted to receive the liquid overflow from the separating tank, a hot water supply pipe outlet coil in said separating tank and submerged in the liquid therein, a heater for the water and having connection with the hot water supply pipe, and a return pipe connected to the heater and having branches communicating with said settling and said separating tanks.

2. In an apparatus of the character specified the combination with a separating tank having a sand discharge valve, of a settling tank surrounding the separating tank and adapted to receive the liqud overflow from the separating tank, a hot water supply pipe outlet coil in said separating tank and submerged in the liquid therein, a heater for the water and having connection with the hot water supply pipe, a return pipe connected to the heater and having branches communicating with said settling and said separating tanks and an oil inlet member connected to the hot water supply pipe and directing the oil into the hot water at approximately right angles to the path of travel of the hot water.

3. In an apparatus of the character specified the combination with a separating tank having sand discharge valve, of a settling tank surrounding the separating tank and adapted to receive the liquid overflow from the separating tank, a hot water supply pipe outlet coil in said separating tank and submerged in the liquid therein, a heater for the water and having connection with the hot water supply pipe, a return pipe connected to the heater and having branches communicating with said settling and said separating tanks, an oil inlet member connected to the hot water supply pipe and directing the oil into the hot water at approximately right angles to the path of travel of the hot water and a gas outlet member connected to the hot water supply pipe.

4. In an apparatus of the character specified the combination with a separating tank having sand discharge valve, of a settling tank surrounding the separating tank and adapted to receive the liquid overflow from the separating tank, a hot water supply pipe outlet coil in said separating tank and submerged in the liquid therein, a heater for the water and having connection with the hot water supply pipe, a return pipe connected to the heater and having branches communicating with said settling and said separating tanks, an oil inlet member connected to the hot water supply pipe and directing the oil into the hot water at approximately right angles to the path of travel of the hot water, a gas outlet member connected to the hot water supply pipe and an oil outlet member arranged in said settling tank and spaced from the separating tank.

In testimony whereof we affix our signatures.

STEVE MILLER.
WILLIAM J. McCARTHY.